(12) United States Patent  
Cheng

(10) Patent No.: US 7,203,458 B1  
(45) Date of Patent: Apr. 10, 2007

(54) METHOD AND APPARATUS FOR POSITION TRACKING AND COMMUNICATION WITHIN A DEFINED LOCALE

(76) Inventor: Alexander L. Cheng, 11 Springdale Ave., White Plains, NY (US) 10604

( * ) Notice: Subject to any disclaimer, the term of this patent is extended or adjusted under 35 U.S.C. 154(b) by 0 days.

(21) Appl. No.: 09/383,688

(22) Filed: Aug. 26, 1999

(51) Int. Cl.  
*H04B 17/00* (2006.01)

(52) U.S. Cl. .............................. 455/67.11; 455/456.1; 455/404.2

(58) Field of Classification Search ................ 455/453, 455/456, 458, 9, 10, 500, 404.2, 456.1, 67.11  
See application file for complete search history.

(56) References Cited

U.S. PATENT DOCUMENTS

| | | | | |
|---|---|---|---|---|
| 5,659,596 A | * | 8/1997 | Dunn | 455/456.1 |
| 5,948,043 A | * | 9/1999 | Mathis | 701/208 |
| 6,127,928 A | * | 10/2000 | Issacman et al. | 340/572.1 |
| 6,154,139 A | * | 11/2000 | Heller | 340/573.4 |
| 6,246,323 B1 | * | 6/2001 | Fischbach | 340/539 |

\* cited by examiner

*Primary Examiner*—Joseph Feild  
*Assistant Examiner*—S. Smith

(57) ABSTRACT

A method and apparatus is disclosed for position tracking and communication within a defined locale. Low power transmitters and receivers, called probes, are placed in key locations throughout the locale, called ranges. The persons or objects to be tracked carry a battery-powered device, called a tag. The battery in the tag can be used to limit the tag's life span (useful for applications such as limited time span, system renewal according to expected turnover rate, etc.), thereby allowing reuse of the ID. The tag is encoded with a two-level ID code with the common part used in communication with probe in normal condition. The tags respond to beacon upon entering a probe's range. The response is gathered by a probe and fed to a central computer where the tag's current position is recorded and combined with site-specific information and past history to determine the most likely position of each tag. Since the tags do not need to perform any complex computation or high-power communication, they can be constructed inexpensively and deployed as a disposable device. The whereabouts and past information can be queried at various reporting locations. There can also be public announcement, such as speaker or display, placed throughout the locale. The tag can be equipped with some alert or display capability for communication. The present invention provides a low cost, highly usable position tracking system. The system is able to function even with radio signal deafening structure, and provides a site-specific meaningful report. This type of system is especially valuable for transient travelers in territories such as in a convention hall, amusement part, shopping mall, cruise ship, etc. This system is also useful to track highly transitory inventory.

9 Claims, 2 Drawing Sheets

METHOD AND APPARATUS FOR POSITION TRACKING AND COMMUNICATION WITHIN A DEFINED LOCALE

FIELD OF THE INVENTION

The present invention pertains generally to electronic equipment for communication, and more specifically to a method and apparatus for position tracking and communication within a defined locale.

BACKGROUND OF THE INVENTION

Paging is a well-defined and mature technology. Typically, short text messages are transmitted via radio signal from a transmitter at a central radio tower to a hand-held device for display. Recently this technology has been expanded to allow short text messages to be transmitted from a hand-held device back to the central radio receiver, then to be relayed to another user. Still, paging is not able to discern the position of any user. Cellular telephony offers another way of communication. There are efforts to discern the location of a mobile unit using reference signals at the base stations with limited success. The radio signals used for these types of communication can often be interrupted inside a building.

Global Positioning System (GPS) is gaining popularity using multiple signals transmitted from satellites in different locations in space to calculate the position of an electronic receiver. The cost and complexity of such device is high while service can often be interrupted inside a building. Moreover, any useful information associated with locality derived from longitude and latitude require costly and potentially vast amounts of data, which may not even be publicly available in some cases.

The concept of "ubiquitous computing," pioneered by Xerox Palo Alto Research Center (www.parc.xerox.com), is generally intended to provide computing in an ubiquitous fashion Instead of carrying a computing device, the environment incorporates a computing facility to serve the user. Each user is given a self-identifying electronic device and the 'computing' facility uses this information to adjust various settings in the room to suit the individual and for other purposes, such as security. The concept requires a complete coverage and permanent association between the device and carrying individual.

There is also an increasing deployment of wireless 'tags,' such as for tolls collection, payment of gasoline purchase, etc. This technology identifies a tag within an area in order to charge a user's account. There is no tracking and no other communication utilities provided. Moreover, this application deals with one tag at a time.

To locate and to communicate with any person or object within a defined area/locale is an useful utility, especially for transient travelers, such as in a convention hall, shopping mall, amusement park, cruise ship, etc.

The present invention overcomes the aforementioned limitations with the following objects:

Low complexity and inexpensive mobile unit;
Pertinent local information;
Position tracking; and
Communication.

Further objects and advantages of the present invention will become apparent from a consideration of the drawings and ensuing description thereof.

DISCUSSION OF PRIOR ART

There are numerous patents for position tracking using GPS, e.g.>U.S. Pat. Nos. 5,767,795, 5,802,492, 5,917,434, 5,450,329, for either vehicle or pedestrian applications. There are also a number of position tracking system using other methods supplementing GPS, e.g., U.S. Pat. Nos. 5,583,775, 5,627,549, 5,892,454, 5,902,351.

There are several schemes using multiple radio signals to determine the location, e.g., U.S. Pat. Nos. 5,631,642, 5,901,358, 5,163,004, 5,883,598, with the last patent disclosing system of spaced based stations to derive best estimate of a mobile unit's location U.S. Pat. No. 5,917,425 discloses a system for the mobile units to receive IR signals and to transmit using radio signal. U.S. Pat. No. 5,892,441 describes a system for sensing using active tags which communicate with each other for asset management.

All of the above require the mobile unit to perform complex computation.

U.S. Pat. No. 5,572,195 deals with control using infrared signal in a LAN environment U.S. Pat. No. 5,898,370 represents a passive, frangible tags for security monitoring purpose. U.S. Pat. No. 5,838,279 provides relief for tracking in a shielded space with restricted movement, such as in a tunnel.

SUMMARY OF THE INVENTION

The present invention discloses a method and apparatus to locate and to communicate with a person or object within a defined area/locale. This utility is useful especially for transient travelers in territories such as in a convention hall, amusement park, shopping mall, cruise ship, etc. The present invention can also be useful for highly transitory inventory.

Low power transmitters and receivers (called probes) are placed in strategic locations throughout the locale. The coverage area of such probe is called a range. The persons or objects to be tracked carry a battery powered device, called a tag, encoded with an unique identifier. The tag can be equipped with or without a display capability or other notification method, e.g., buzzer. The tags and probes communicate with each other using either radio or infrared (IR) means for the following types of information:

Personal messages and alert;
Tourist information broadcast such as announcements, events, etc.;
Location information, direction, and other derived information; and
Others.

The communication method between tag and probe can use a scheme similar to any one of the existing multiple access scheme, such as signaling channel of cellular telephony or the scheme in U.S. Pat. No. 5,563,883. Upon receiving beacon from a probe (the tag has entered the coverage area of said probe), the tag sends a short message with its own identifier.

The probe gathers the response from the tags and feeds it to a central computing device. Both the past history and site specific information (layout, exhibition themes, etc.) can be used to determine the whereabouts of such tag, and to update the database. The more past history information on a particular tag is gathered in the system, the more confident the system is able to determine the tag's present location.

Interested parties with an authorization code can retrieve the location, in terms of the layout of the locale, of a particular tag using a separate electronic device, e.g., kiosk.

A public announcement method, such as speaker or display, can be placed in desired location to alert the person wearing the tag. A short message can also be sent to the tag upon request.

The unique identifier (ID) of each tag is broken into 2 parts, called GROUP and COMMON respectively, for efficiency purpose. The totality of these 2 parts is intended to ensure unique identification in the world population of tags, but only the COMMON part is used for efficiency reason in normal communication with the probe. The size of COMMON part should be enough to ensure the unique identification of tags in most situations. The probe will inquire about the GROUP part if there is a conflict with same COMMON ID within the locale. Upon ascertaining a conflict, the 'unlawful' tag will be instructed to 'shut down', while the system administrator is notified. The battery in a tag can be used to limit its life-span for specific applications (validity for a fixed time period, expected turnover rate, etc.), thereby allowing reuse of the ID. Different frequency bands for communication can also be used to separate classes of IDs.

Low cost, light weight, non-invasive, low electro-magnetic exposure can be accomplished using short range transmitters and receivers with either radio or infrared (IR) transmission means. The required amount of data to be transmitted for position tracking and communication is fairly low. The rate of transmission needs to consider the speed of the tags crossing a probe's range. If radio is used, the required bandwidth can be conveniently allocated in any available spectrum while the frequency band can be selected to suit the physical construction in terms of penetration, propagation, reflection, etc.

Unlike the cellular telephony, the coverage areas of probes should not overlap. This can be most easily achieved through physical separation by the strategic placement of probes. Each coverage area marks the boundaries defined in database for position tracking and queries. The transmission power of probes can be adjusted for their desired coverage.

Therefore, the benefits of the present invention are:
Low complexity and cost;
Pertinent site specific information;
Direction and position tracking; and
Communication.

DETAILED DESCRIPTION OF THE PREFERRED EMBODIMENT

The present invention discloses a method and apparatus for position tracking and communication within a defined locale.

Once a tag enters the locale, the central computer tracks the whereabouts of such tag, and maintains a database of the movement of each tag as they cross different probes' ranges. Although it is not possible to know for sure the exact location of each tag, the computer is able to provide the whereabouts in the order of probability assuming the person/object is moving in a forward direction. The placement of additional probes in key location can also help pinpoint the tag's location.

The past history of a tag's movement with timing information and site specific information, e.g., building layout, exhibition theme and flow, can be used to determine the likelihood of such tag's exact location. The site's layout and likely flow are modeled as weighted FSM (finite state machine) with each tag's movement and current location as a series of states through the site's FSM. Any discrepancy detected while traveling through the FSM can be an indication of a compromised path (e.g., broken partition) or a failed probe.

Figure 1:
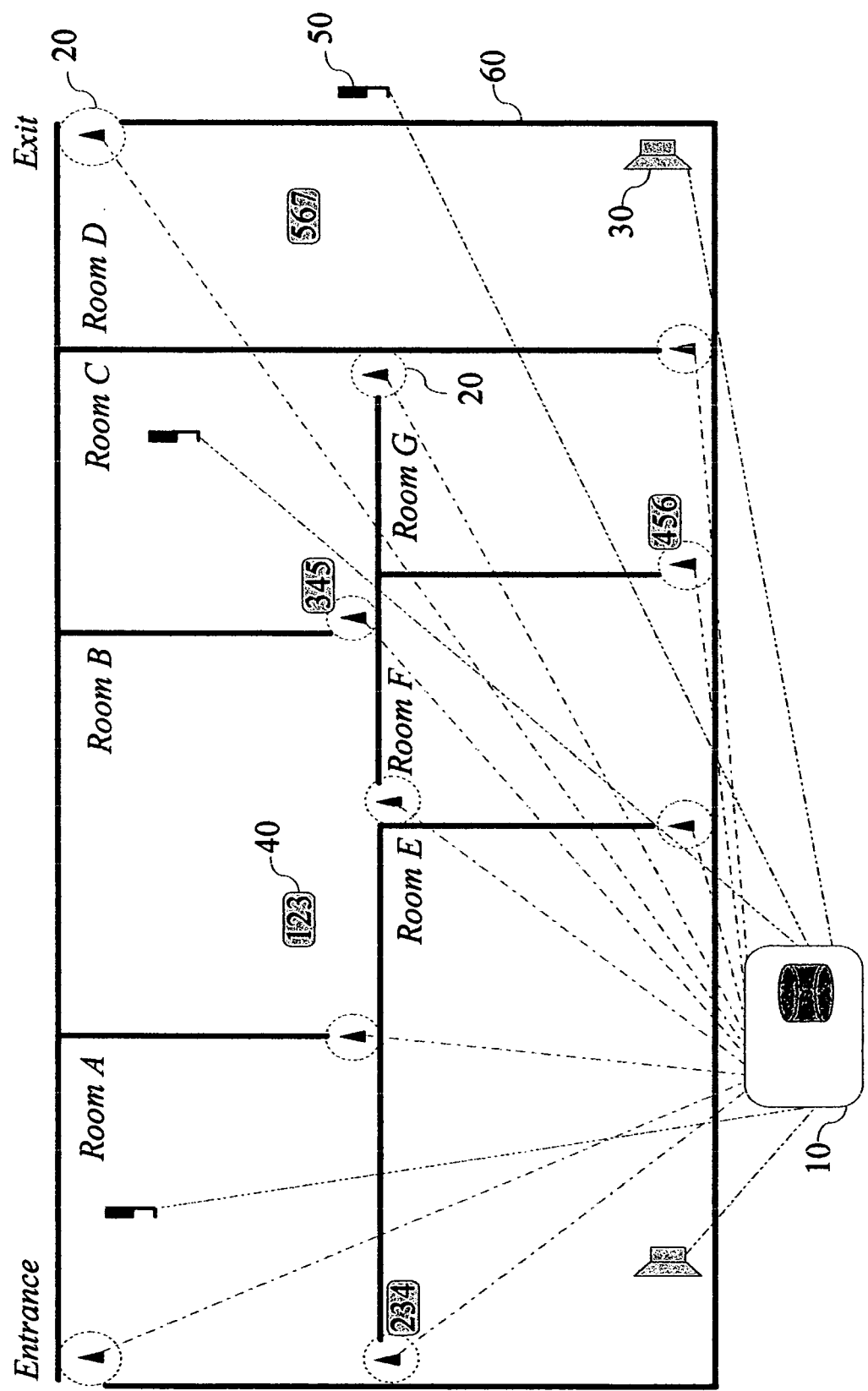
FIG. 1 depicts the system architecture overlaying an exemplary building structure.

In FIG. 1, an exhibition hall is diagrammed for illustration purpose. The building structure 60 are marked by thick straight lines. Overlaying this building layout, a position tracking and communication system is diagrammed.

A plurality of probes 20 are placed at key locations throughout this exhibition hall. These probes are connected to a central computer containing data storage 10. A number of public announcements, e.g., speaker or display 30, placed in key locations are controlled by the computer for providing message to the persons wearing the tags, which are deemed nearby through the position tracking ability.

A plurality of tags 40 move through the exhibition hall and come in contact with the probes 20. Each tag's position is tracked by the computer system based on the response received by the probes 20. A tag's position and other derived information, such as its past track, can be queried through data entry and retrieval point 50.

Figure 2:
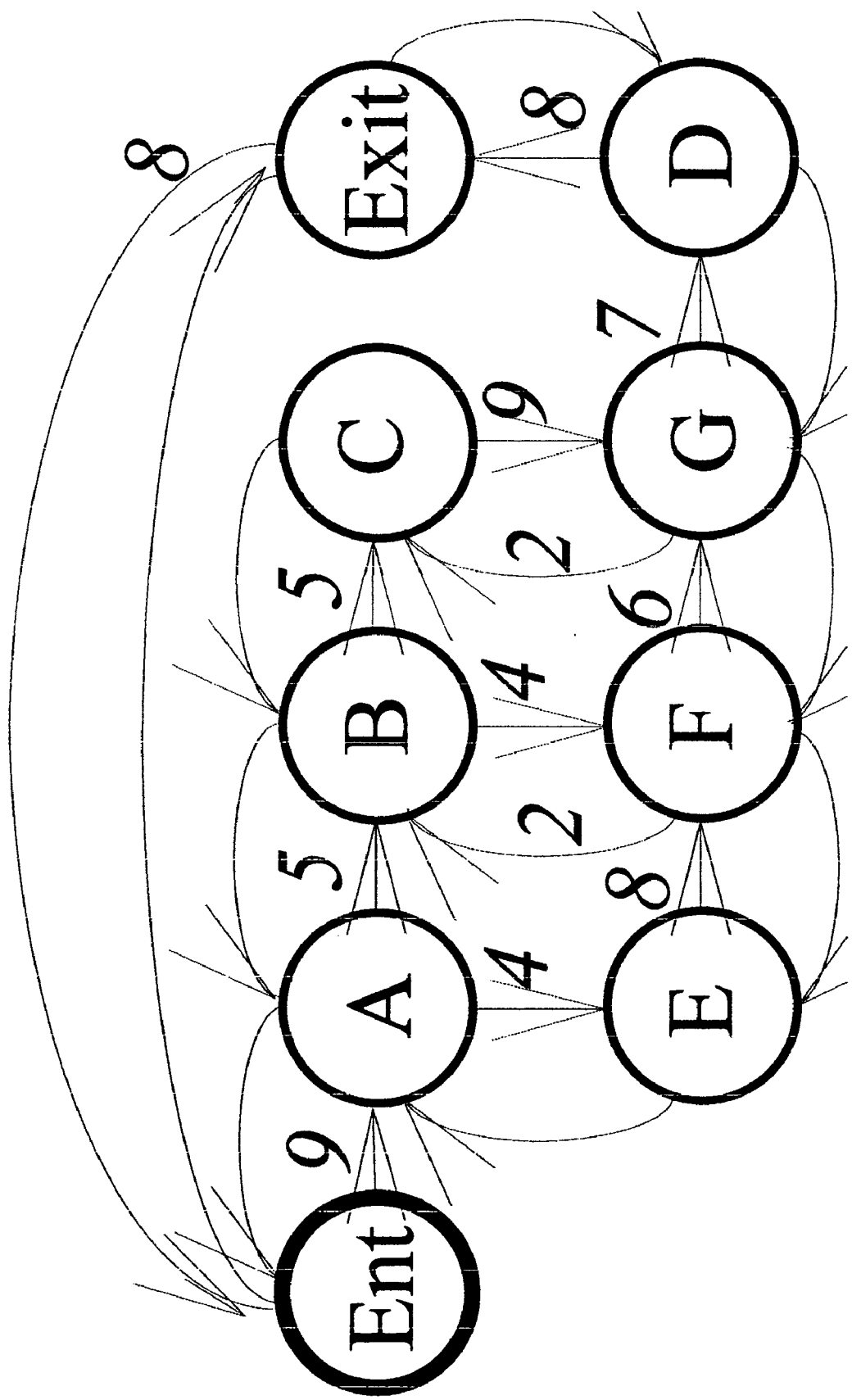
FIG. 2 is the finite state machine corresponding to the building layout in FIG. 1.

In FIG. 2, the site is modeled as a finite state machine with weights. The initial state is marketed with a thick circle where all tag should be registered upon entering the locale. Possible transitions are marked as arrows between states, while the weights attached to these transitions indicate the probabilities of that transitions being taken. Upon entering the locale, a tag is registered as in Entrance state, marked as 'Ent' in the FSM. At this state, for instance, a tag has a probability of 9 out of 10 to enter Room A, with the balance (a default value) of 1 out of 10 for going to the Exit section of the exhibition hall. These probability values match the design of the exhibition, where the theme flows naturally from one room to the other. This information helps to determine the most probable position of each tag. In this example, there are two themes, one with the room sequence A-B-C-G-D, and the other one follows A-E-F-G-D.

In this example, tag 123 has just left the range between Room A and B. If its previous position is at the Entrance and it has taken a fair amount of time since last response, it is very likely that the person wearing the tag has progressed from Room A to B. If the elapsed time is short, it is probable that the person wearing the tag is still wondering in Room A.

Suppose that tag 345 has entered the range between Room B and C. If its previous position is at the opening between Room E and F and it has taken a fair amount of time since last response, it is possible either there is a compromised passage between Room F and B or C, or the probe between Room B and F is defective. Other occurrences of similar events can help further deduce the most likely cause for this discrepancy.

Suppose tag 234 has entered the range between Room A and E for the second time. And suppose its previous position is at the Entrance and a fair amount of time has elapsed since last response, it is very probable that the person wearing the tag has progressed from Room A to E and decided to backtrack. If the time between two occurrences of entering the range between Room A and E is short, then it is probable that the tag wearer is wondering in the opening area.

Suppose tag 456 has followed the path with room sequence A-B-C-G and has entered the range between Room F and G. If a fair amount of time has elapsed since last response, it is very likely that the person wearing the tag is going to explore the other theme line. Otherwise, it is probable that the tag wearer is wondering in the opening area.

Suppose tag 567 has followed the path with room sequence A-B-C-G and the amount of time spent in each room has been quite consistent. If the time since last response in the range between Room D and G falls short of the norm in its past history, it is likely that the person wearing the tag is still in Room G. Otherwise the tag wearer has progressed to Room D.

From the foregoing, it will be observed that numerous variations and modifications may be effected without departing from the true spirit and scope of the novel concept of the invention. It should be understood that no limitation with respect to the specific structure and circuit arrangements illustrated is intended or should be inferred. It is, of course, intended to cover by the appended claims all such modifications as fall within the scope of the claims.

Thus, in accordance with the invention, a Method And Apparatus for Position Tracking And Communication Within A Defined Locale has been provided accomplishing all of the objects, and having the features and advantages specified at the beginning of this specification. It is to be understood that the disclosed construction of the invention may be embodied in other forms within the scope of the claims.

What is claimed is:

1. A method of position tracking and communication in a locale with a plurality of probes interconnected to a computing device and having a least one mobile device, comprising the steps of:
   (a) placing said probes at locations in said locale;
   (b) modeling said locale with site-specific information using a network of states and transitions with probabilities;
   (c) deploying at least one of said mobile devices in said locale;
   (d) encoding each of said deployed mobile devices with an identifier;
   (e) sending out beacons by said probes;
   (f) responding by at least one of said mobile devices upon receiving said beacon from at least one of said probes;
   (g) gathering the whereabouts of said mobile device to input to said computing device;
   (h) calculating the most probable location of said mobile device using said whereabouts of said mobile device and said network of states and transitions with probabilities; and
   (i) updating location information for said mobile device.

2. In the method of position tracking and communication of claim 1, wherein deploying at least one of said mobile devices comprises the steps of;
   (a) calculating the desired life span of said mobile device;
   (b) equipping said mobile device with battery power sources corresponding to said desired life span; and
   (c) attaching said mobile device to a person or object to be tracked.

3. In the method of position tracking and communication of claim 1, wherein said encoding with an identifier comprises the steps of;
   (a) calculating the necessary number of mobile devices in the locale;
   (b) separating said identifier into two parts, one common part for uniqueness within said locale and one group part for supplementary use;
   (c) communicating said common part to said probes;
   (d) sending said group part of said identifier to said probes upon request; and
   (e) reusing said identifier when said mobile device encoded with said identifier has exhausted its battery power.

4. In the method of position tracking and communication of claim 1, wherein calculating the most probable location of said mobile device comprises the steps of;
   (a) retrieving the current location of said mobile device;
   (b) retrieving the past history of said mobile device; and
   (c) mapping said current location and said history of said mobile device with site specific information using said network of states and transitions with probabilities.

5. The method of position tracking and communication of claim 1, further comprising the step of notifying said mobile device with a message comprising the steps of;
   (a) calculating said location of said mobile device;
   (b) determining which messaging device is appropriate to communicate with said mobile device; and
   (c) sending said message to said messaging device for transmission to said mobile device.

6. In the method of position tracking and communication of claim 1, wherein updating said location information for said mobile device comprises the steps of;
   (a) retrieving current location of said mobile device;
   (b) calculating for discrepancies with said site specific information;
   (c) retrieving history data on similar occurrence(s);
   (d) alerting a system operator of said discrepancies; and
   (e) changing said network of states and transitions with probabilities.

7. The method of position tracking and communication of claim 1, wherein placing said probes at locations in said locale comprises the step of placing said probes in locations with non-overlapping coverage areas.

8. A system for position tracking and communication in a locale having a plurality of probes interconnected to a computing device and having at least one mobile device in the locale, comprising:
   (a) configuring means to place said probes in said locale;
   (b) modeling means to model said locale with site specific information using a network of states and transitions with probabilities;
   (c) installing means to deploy at least one of said mobile devices in said locale for position tracking and communication;
   (d) installing means to encode each of said mobile devices with an identifier;
   (e) probing means to send out beacons by said probes;
   (f) responding means for said mobile device upon receiving said beacon from said probes;
   (g) collecting means to gather the whereabouts of said mobile devices to feed to the computing device;
   (h) determining means to calculate the most likely location of said mobile device; and
   (i) updating means to calculate location changes of said mobile device.

9. The system for position tracking and communication of claim 8, further comprising a means for notifying said mobile device with a message, comprising;
   (a) calculating means to calculate said location of said mobile device;
   (b) determining means for determining which messaging device is appropriate to communicate with said mobile device; and
   (c) sending means to transmit said message to said messaging device for transmission to said mobile device.

* * * * *